July 18, 1944.　　　G. HYDE　　　2,353,828
CINDER METERING
Filed July 24, 1943　　　5 Sheets-Sheet 2
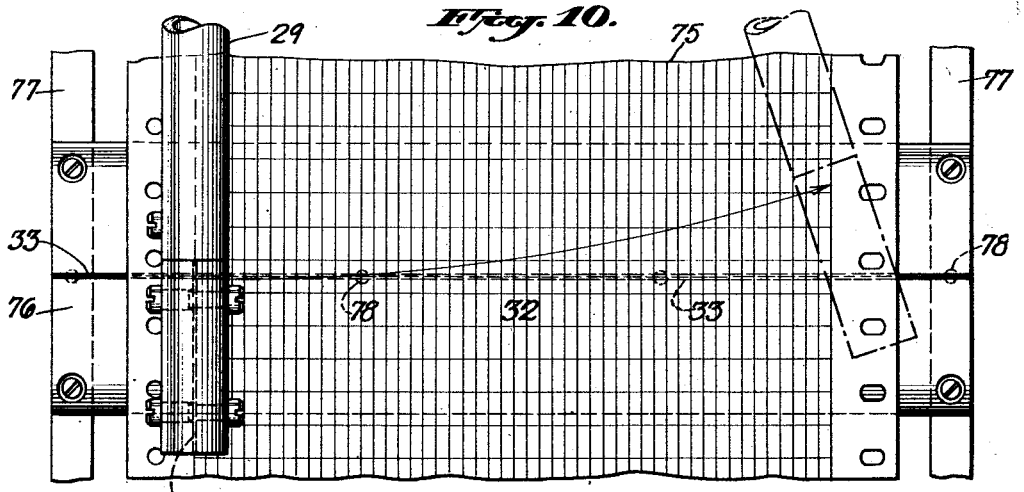
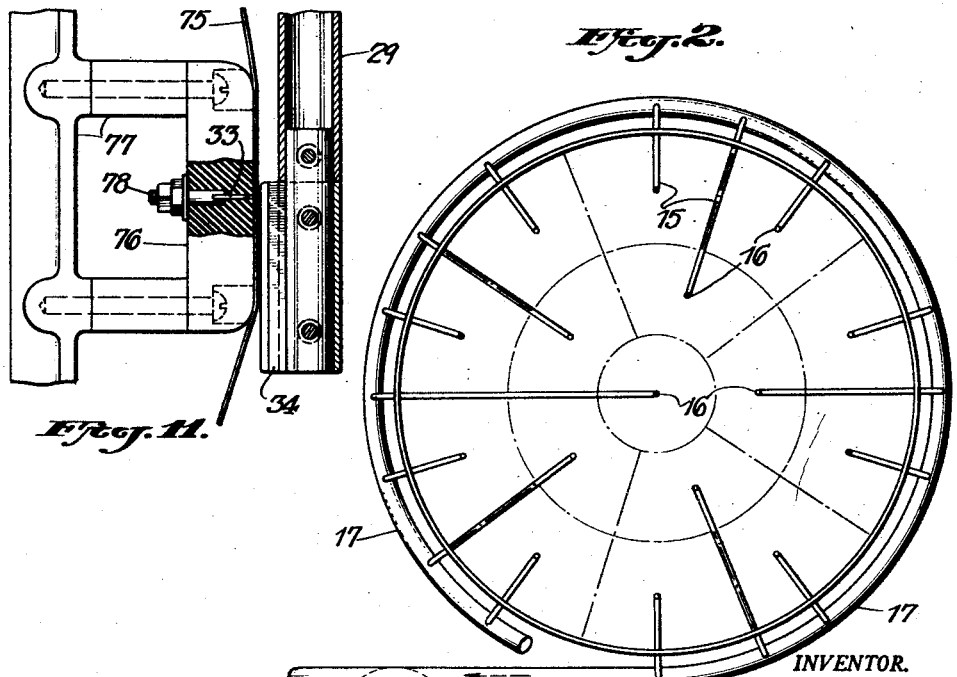
INVENTOR.
GEORGE HYDE.
BY Ward, Crosby & Neal
ATTORNEYS.

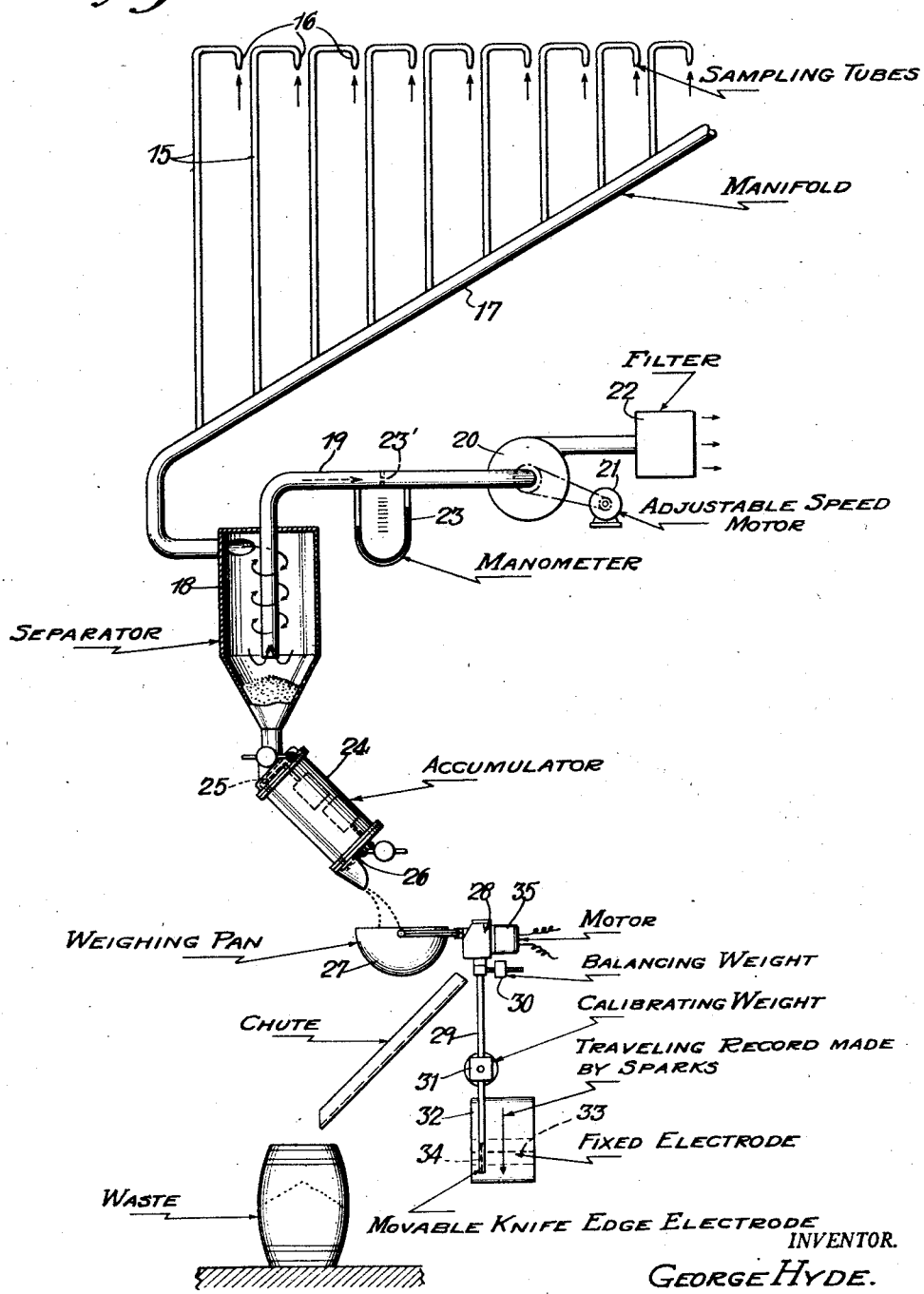

July 18, 1944.   G. HYDE   2,353,828
CINDER METERING
Filed July 24, 1943   5 Sheets-Sheet 3
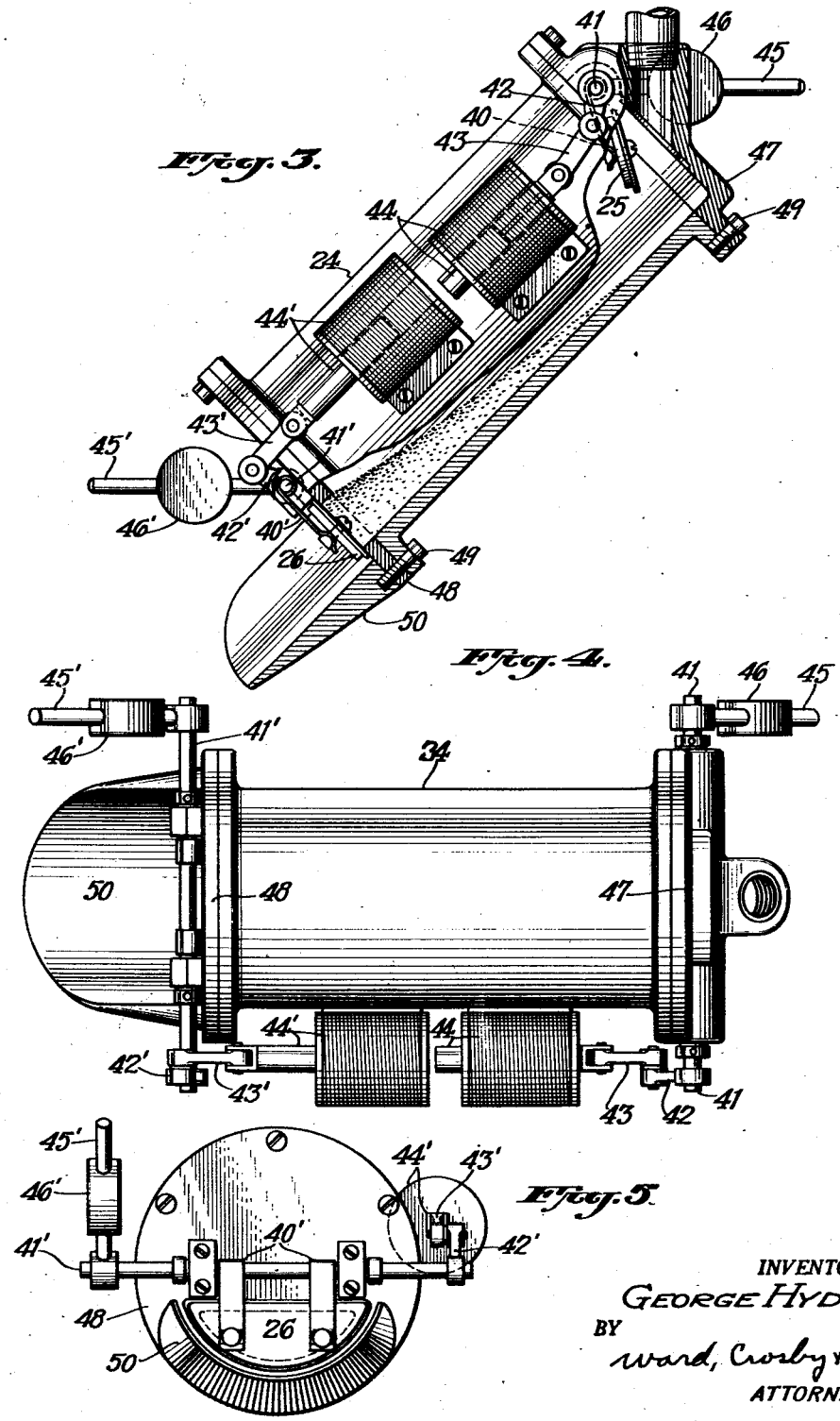
INVENTOR.
GEORGE HYDE.
BY
Ward, Crosby & Neal
ATTORNEYS.

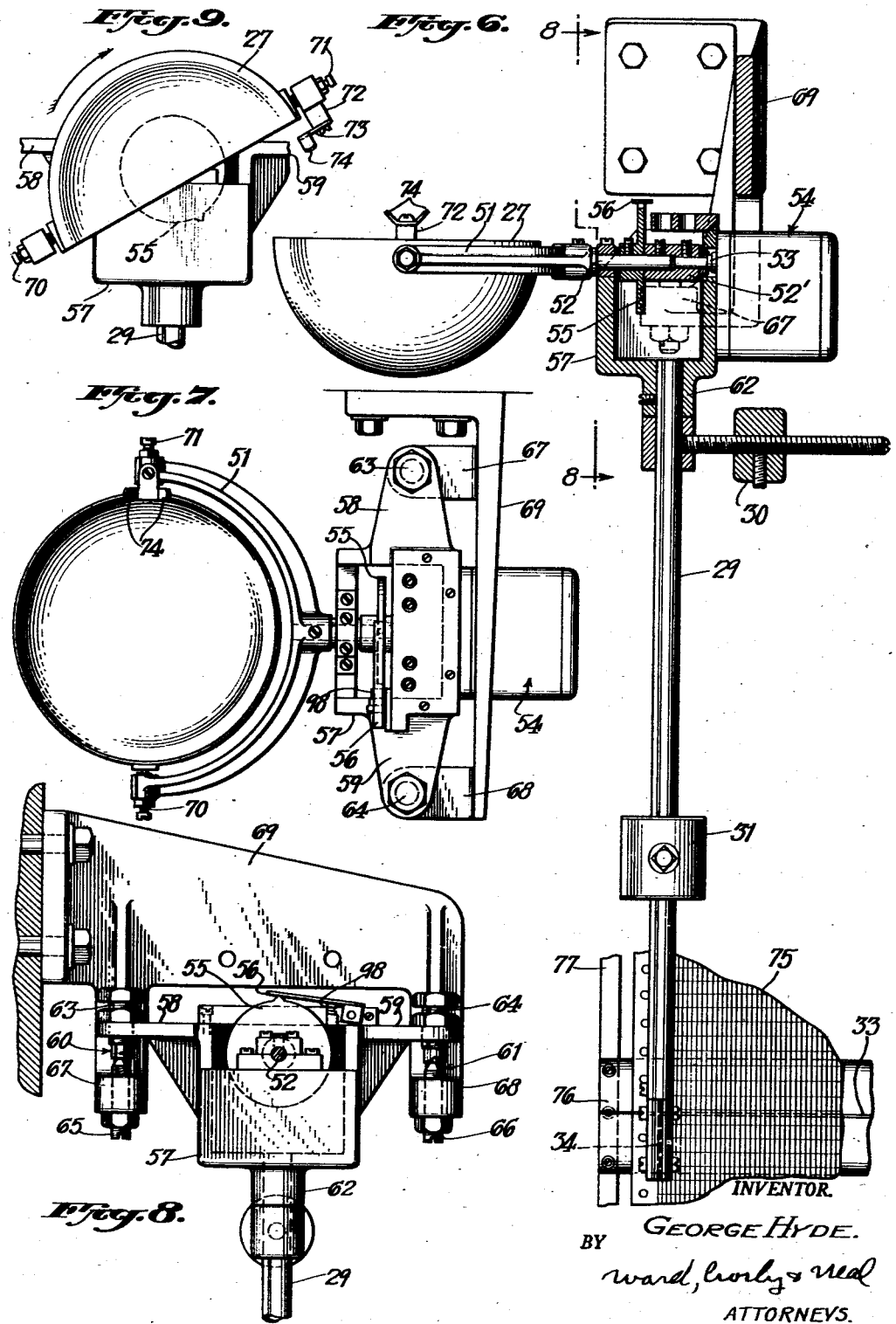

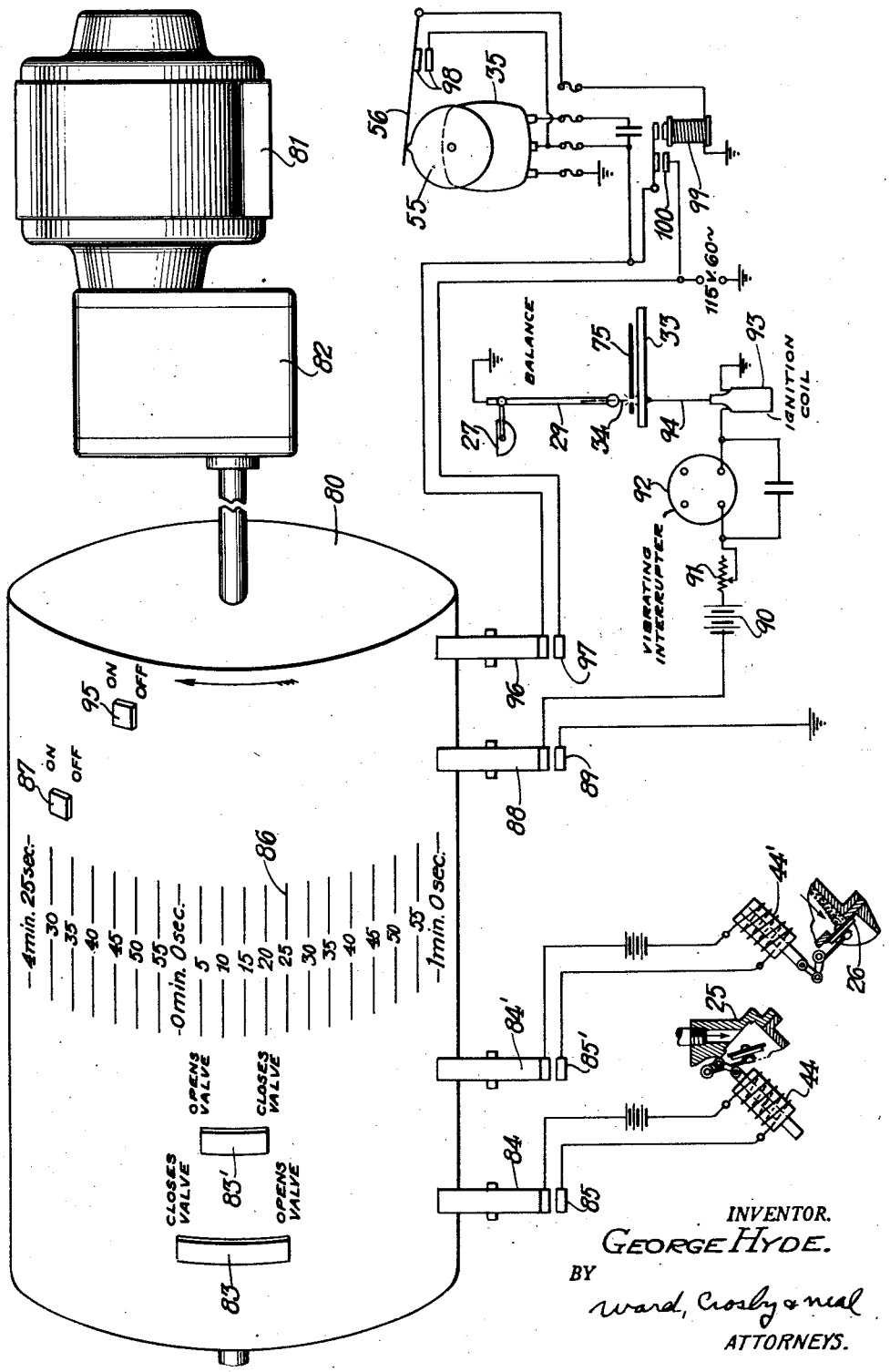

Patented July 18, 1944

2,353,828

UNITED STATES PATENT OFFICE 2,353,828

CINDER METERING

George Hyde, Darien, Conn., assignor to Consolidated Edison Company of New York, Inc., New York, N. Y., a corporation of New York Application July 24, 1943, Serial No. 496,019

9 Claims. (Cl. 73—21)

This invention relates to automatic weighing or metering apparatus adapted among other possible uses, for metering the flow of cinders or other divided particles passing through a stack or other conduit.

In accordance with the present invention as applied to the problem of metering cinders, sampling tubes may be arranged in a smokestack and connected to a suction blower so as to withdraw from the chimney, small continuously supplied samples of cinders which vary in amount substantially according to the varying total flow of cinder through the stack. These samples are separated from accompanying gases and passed into an accumulator. The accumulator is arranged to automatically dump its charge of cinders at predetermined intervals into the weighing pan of an automatically controlled weighing balance arrangement. This balance arrangement may be associated with apparatus for automatically recording the amount weighed at each of said intervals, after which the weighing pan is dumped and made ready to receive the next charge from the accumulator. The accumulator, weighing balance and recording means are preferably automatically controlled by electrical circuit means, associated with a single timing arrangement which determines the sequence of operations automatically.

Various further and more specific objects, features and advantages of the invention will appear from the detailed description given below taken in connection with the accompanying drawings which form a part of this specification and illustrate merely by way of example, a preferred form of the invention. The invention consists in such novel features and combinations of parts as may be shown and described in connection with the apparatus herein disclosed.

In the drawings,

Fig. 1 is a schematic diagram of a preferred embodiment of the invention as used for cinder metering;

Fig. 2 is a sectional view through a chimney showing a preferred arrangement of sampling tubes;

Figs. 3, 4 and 5 respectively are side, top and end views showing the accumulator in further detail;

Fig. 6 is a side view partly in section showing the weighing balance and portions of the recording apparatus;

Fig. 7 is a top view of the apparatus of Fig. 6;

Fig. 8 is a sectional view taken substantially along line 8—8 of Fig. 6;

Fig. 9 is a view showing the weighing pan in its dumping position;

Figs. 10 and 11 are front and side views of the recording apparatus;

Fig. 12 is a view of one of the electrodes used in making the record by means of spark discharges; and Fig. 13 is a schematic diagram of the electrical control circuits and timing arrangement.

Referring now to Fig. 1, a plurality of sampling tubes may be provided as at 15, which per se may be of a suitable known construction having downwardly directed inlets as at 16 for continuously receiving particles flowing upwardly, as in a chimney or other conduit. The sampling tubes may be installed in a smokestack in accordance with the arrangement shown in Fig. 2. That is, the cross section of the stack may be theoretically divided into a number of substantially equal areas as indicated by the dash lines. In the example shown there are 16 of such areas, at the centroid of each of which, one of the sampling tube inlets is located, and the sampling tubes 15 may extend radially to and through the walls of the stack and then downwardly to a downwardly inclined manifold 17 extending circumferentially around the outside of the stack. A developed view of this arrangement is shown in Fig. 1. The manifold 17 may be connected to discharge into a vortex type separator as at 18, which may be of the type known in the trade under the name "Cyclone." The samples may be drawn into the separator by suction applied through a conduit 19 connected to a suction blower 20 driven as by an adjustable speed motor 21. The blower may discharge the separated gases through a filter as at 22. The conduit 19 may have associated therewith a manometer as at 23 having an orifice 23' in the conduit. Thus the motor speed may be adjusted to provide a predetermined suction as measured at the manometer.

The separator 18 may be connected to discharge the separated cinders or particles into an accumulator 24. This may comprise for example a cylindrical tank mounted in an inclined position as shown, and having at its upper end a normally open inlet valve 25 and at its lower end a normally closed outlet valve 26, such valves being controlled for periodic opening and closing, by solenoids as hereinafter described.

The operation of the equipment as thus far described is as follows. A constant predetermined suction is applied to the separator through conduit 19 and serves to continuously draw into each of the sampling tube inlets, cinders at a rate varying substantially in direct proportion to the varying total flow of cinders through each of the corresponding stack areas respectively, into which the stack cross section is theoretically divided as shown in Fig. 2. Such samples are collected in the manifold 17, and because of its inclination, as well as the suction, same are caused to flow into the separator 18. Thus cinders are supplied to the separator at a rate varying substantially in accordance with the rate of total flow of cinders up the stack. The amount of suction necessary will of course depend upon the velocity of the sampled gas stream and may be determined in accordance with standard sampling practice as outlined in the A. S. M. E. Power Test Codes for Dust-Separating Apparatus (Bulletin PTC 21–1941, page 12 for example).

Circuit arrangements are provided for closing the accumulator inlet valve 25 at predetermined intervals. Shortly thereafter outlet valve 26 is opened for dumping the accumulated charge into a weighing pan 27, whereupon the outlet valve 26 is automatically closed and shortly thereafter inlet valve 25 is again opened to admit the next charge to the accumulator.

The weighing pan 27 forms a part of a pivotally mounted weighing balance assembly 28 having a pendulum 29. Suitable balance and calibrating weights as at 30, 31 may be mounted as shown on this pendulum. The lower end of the pendulum 29 is adapted to swing over an area 32 along which a suitable traveling record strip is adapted to pass in the direction shown by the arrow. A fixed knife edge electrode 33 may be arranged transversely under the record strip for cooperating with a movable vertically extending knife edge electrode 34 carried by the pendulum. Circuit means as hereinafter described are provided for causing a spark discharge between these electrodes at a predetermined time after the weighing pan 27 is filled, viz., as soon as the balance assumes a stable position. Thereupon the pan 27 is adapted to be automatically rotated for dumping, as by a motor 35 carried on the balance assembly and connected to rotate the pan through one complete turn and to then stop until after the next weighing and recording operation. The cinders upon being dumped from the pan may pass down a chute as shown, to a waste receptacle.

Referring now to Figs. 3–5 as to further details of the accumulator construction, the inlet valve 25 is adapted to swing from an inner open position, outwardly upon somewhat yieldable arms 40 fixed to a shaft as at 41. The shaft 41 is adapted to be turned for opening and closing the valve, by a crank 42 connected by a link 43 to a solenoid 44. The shaft 41 may also have fixed thereon an arm 45 for carrying a weight 46 adjustable in position along the arm for varying the pressure applied through the shaft for holding the inlet valve normally open.

The outlet valve 26 at the lower end of the accumulator is adapted to be operated by a solenoid and connecting means therefor with parts similar to those above described for the inlet valve, corresponding parts being identified by the same reference numerals accompanied by prime marks. However, it will be noted that while the solenoid 44 is arranged to swing the valve 25 upwardly to closed position, solenoid 44′ is connected in a reverse manner to swing valve 26 downwardly to open position. The valves and operating means therefor may be mounted on removable upper and lower end plates 47, 48. These plates as shown may be secured to the body of the accumulator as by bolts 49, whereby they may be removed for inspection, cleaning or repair of the parts. At the outlet a downwardly extending delivery spout 50 may also be removably secured in place by certain of the bolts 49.

Referring now to Figs. 6–9 as to further details of the weighing balance assembly, the pan 27 is shown pivotally mounted at its sides in a yoke 51, which yoke at its base is secured to a rotatable shaft 52 connected by a bushing member 52′ to a drive shaft 53 of a motor assembly 54. The assembly 54 may include suitable reduction gearing for driving the shaft 52 quite slowly and as above indicated, the motor may be accompanied by control circuits hereinafter described for causing it to turn the shaft 52 through a single complete revolution to dump the pan 27 at predetermined time intervals. The circuits for the motor may be under the control of a cam 55 fixed upon shaft 52, this cam being adapted as shown in Fig. 8 to operate a stop switch element 56 when the desired single revolution of the pan is completed.

As shown in Figs. 6–8, the motor assembly may be fixed to a box-like frame 57, in which the shaft 52 is also journaled. The frame 57 includes oppositely extending supporting arms 58, 59 running out to pin-point bearing assemblies at 60, 61 which serve to mount the balance assembly for swinging movement under the control of the pendulum 29 and its adjustable balance and calibrating weights 30, 31, the pendulum being secured as at 62 to the lower portion of the frame 57. The bearing means 60, 61 may include female bearing screws 63, 64 adjustably mounted on the frame arms 58, 59 respectively; also adjustable pointed male bearing screws as at 65, 66. The latter screws as shown may be adjustably mounted in bracket portions 67, 68 forming depending parts of a supporting bracket 69 for the entire balance.

As shown in Figs. 6, 7 and 9, the pan 27 is pivoted at opposite sides to the yoke 51 by adjustable pivoting screws 70, 71. Adjacent to one of the bearing portions on the yoke, the yoke may be formed with an upwardly protruding portion 72. An inwardly protruding sheet metal piece 73 may be fixed as shown by a screw to the portion 72, the piece 73 having upwardly and outwardly bent wing portions as at 74, which are intended to engage the rim of the pan 27 when it tilts in either direction about its bearings 70, 71, and thus prevent the pan from turning over completely except as it is rotated about the axis of shaft 52.

The recording apparatus as shown in the lower part of Fig. 6 and in Figs. 10–12, will now be described in further detail. A record strip is shown at 75 formed of paper, film or other suitable dielectric material of a relatively non-combustible character. This strip may be driven vertically downwardly at a constant predetermined rate by suitable known types of record strip driving means (not shown). The strip may be printed with spaced vertical lines corresponding from left to right to various increasing weight notations. The strip may also be printed as shown with spaced horizontal lines for demarking successive time periods. At the recording area the strip may pass over an insulation supporting and guiding piece 76 mounted upon suitable frame members as at 77 at an elevation corresponding to that of the arcuate area over which the knife edge electrode 34 is swung by the pendulum 29. The stationary transverse electrode 33, is fixed in the insulation piece 76 as by screws 78.

The apparatus for controlling the time sequence for the operation of various parts of the equipment will now be described in further detail in connection with the somewhat schematic diagram of Fig. 13. This equipment may comprise a rotatable member 80 driven at a predetermined constant speed, as by a motor 81 through gear box 82, and so as to rotate through one complete revolution, for example during a period of five minutes, the rotation being in the direction indicated by the arrow. Member 80 may be provided with a cam at 83 for causing a pivotally mounted switch contact 84 to open and close a circuit with respect to contact 85, which in turn as shown controls the operating circuit of the accumulator inlet valve solenoid 44. That is, when the leading end of the cam 83 causes this solenoid circuit to be closed, the inlet valve is closed and remains closed until the trailing end of the cam 83 allows the contacts 84, 85 to fall to open circuit position. Similarly, a cam 83' controls contacts 84', 85', for the control of the outlet valve solenoid 44'.

Subdivision indications of the 5 minute time cycle of rotation of the member 80 are shown at 86 in Fig. 13. From these it will be apparent that the cam 83 causes the accumulator inlet valve to close at the beginning of the cycle. Then 5 seconds later, the accumulator outlet valve is caused to be opened by the cam 83'. This valve may remain open, say for 15 seconds and as shown, is closed after the time cycle has proceeded for 20 seconds. After 25 seconds, the inlet valve is again opened. At this stage the charge of cinders in the accumulator will have been dumped into the weighing pan and the accumulator will have been restored to condition for receiving the next charge.

Another cam 87 is shown on member 80 for operating circuit control contacts 88, 89. A series circuit controlled by these contacts is shown, including a source of power 90, adjustable resistance 91, and vibrating interrupter 92 with accompanying parallel condenser, and an ignition coil 93. The high tension circuit of the ignition coil may run from ground through the high tension winding, thence through connection 94 to the stationary spark electrode 33 for cooperating with the pendulum supporting electrode 34, the latter being grounded through the pendulum as shown.

The cam 87 is located at a point on rotating member 80, such as to cause energization of the spark circuit as soon as the weighing balance has assumed a stable position after the weighing pan has received a charge of cinders. In the example shown, this may occur after the 5 minute time cycle has been under way for 4 minutes, 30 seconds. Cam 87 may as shown be relatively short, so that the spark circuit will be deenergized before the sparks can cause burning of the record strip.

It will be apparent that the record as formed on the strip 75 will comprise a series of apertures caused by the sparks. With the example shown these apertures will be spaced apart on the record strip by vertical distances each corresponding to about 5 minutes and the positions of these apertures across the strip will depend upon the amount of cinders weighed during each operation of the balance, viz., the varying amounts discharged from the accumulator on each cycle of operation. The time of each cycle should of course be so chosen, as in the above example, normally to be shorter than the time required for the accumulator to become completely filled, otherwise of course any excess of cinders beyond what is required to fill the accumulator might eventually be sufficient to cause blocking of the separator with cinders. Also the recording means might simply indicate a series of equal weights, each representing the weight of cinders in the accumulator when full.

A further cam 95 is provided on rotatable member 80 for actuating contacts 96, 97, which in turn control the circuits for motor 35. This circuit may comprise any suitable known type of control circuit for causing the motor to start when the contacts 96, 97 are closed and to stop as soon as motor cam 55 has turned through one complete revolution. For example, as here shown, a self-starting motor is adapted to have a grounded source of power initially applied to its connections through contacts 96, 97. In the sketch a capacitor motor is shown. As soon as the motor starts, the same source of power as shown will be connected through contacts at 98 to energize a relay magnet 99. The relay in turn will close contacts 100 for maintaining connection from the source of power to the motor after cam 95 has allowed contacts 96, 97 to open. Relay 99 will continue to maintain the motor circuits energized through contacts 100 until cam 55 completes one revolution, at which time the stop switch member 56 opens contacts 98, deenergizing the relay. Meanwhile during the single revolution of the cam 55 as above explained, the weighing pan will be rotated for dumping as shown in Fig. 9, and finally restored to position for the next charge, as shown in Fig. 6.

While the apparatus has been described by way of example in connection with the metering of cinders flowing through a stack, it will be understood that the invention is equally applicable and may perhaps be more often used where the sampling means is arranged in ducts, flues, boiler passages or other channels. Also certain features of the invention are well adapted for the metering of ash particles or other finely divided particles, in the form of dust, droplets, mist, etc., as in metallurgical industries, or particles coming from cracking stills and other chemical processing equipment wherein the particles are carried along in a flowing stream of gas or other fluid.

While the invention has been described in detail with respect to a particular preferred example, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. Apparatus for effectively measuring the flow of particles carried in a fluid stream, comprising sampling tube means in the stream, equipment for applying thereto a suction for withdrawing particles from the stream, means for accumulating substantial masses of the withdrawn particles, said equipment being constructed and arranged for discharging the particles as thus withdrawn, into said accumulating means, means for automatically dumping and weighing the contents of the accumulator at fixed predetermined intervals, and means for concurrently recording the weights thus obtained.

2. Apparatus for effectively measuring the flow of particles carried in a fluid stream, comprising a sampling tube means in the stream, a vortex type separator connected thereto, apparatus for continuously maintaining suction for drawing particles through said sampling tube means into said separator, an accumulator compartment connected to receive the particles as discharged from said separator, and means for automatically dumping and weighing the particles accumulated in the accumulator, at fixed predetermined intervals.

3. Apparatus for effectively measuring the varying rate of the discharge of particles carried in a fluid stream, comprising sampling tube means in the stream, equipment for applying thereto a suction for withdrawing particles from the stream, means for accumulating substantial masses of the withdrawn particles, said equipment being constructed and arranged for discharging the particles as thus withdrawn, into said accumulating means, and means for automatically dumping and measuring the particles accumulated in the accumulating means, at fixed predetermined intervals.

4. Apparatus for effectively measuring the flow of particles carried in a fluid stream, comprising sampling tube means in the stream, equipment for applying thereto a suction for withdrawing particles from the stream, an accumulator connected to receive the particles thus withdrawn, electromagnetically operated inlet and outlet valves for said accumulator, said inlet valve being normally open and said outlet valve normally closed, time controlled means for causing automatic closing of said inlet valve at predetermined regular intervals for a period sufficient for dumping the accumulator contents, said time controlled means being also constructed and arranged for causing opening of said outlet valve after the closing of said inlet valve and until a time prior to reopening of the inlet valve, to thereby dump said contents at regular intervals, and means for automatically weighing and recording the weight of said contents after each dumping action.

5. In combination, apparatus for supplying at regular intervals from a flue for combustion equipment, masses of cinders representing respectively substantially predetermined portions of the total quantity of cinders passing through the flue during the time of each interval, a weighing balance for receiving said supplies, a time cycle control device for determining said intervals, a weight recorder associated with said balance, means associated with said control device for operating said recorder at a predetermined time after each supply of cinders is received by the balance, means for discharging each supply from the balance, and means also associated with said control device for operating said discharging means after each operation of the recorder and prior to the next supply.

6. In combination, apparatus for supplying at regular intervals from a flue for combustion equipment, masses of cinders representing respectively substantially predetermined portions of the total quantity of cinders passing through the flue during the time of each interval, a weighing balance for receiving said supplies, a time cycle control device for determining said intervals, a weight recorder associated with said balance, means associated with said control device for operating said recorder at a predetermined time after each supply of cinders is received by the balance, means for discharging each supply from the balance before the next sample is received.

7. Apparatus for metering the flow of finely divided particles as carried by a fluid stream, comprising means for continuously withdrawing from the stream a relatively small substantially constant proportion of the total amount of the particles being carried past the region of withdrawal, an accumulator for receiving said withdrawn particles, a time controlled device for discharging said accumulator at predetermined timed intervals normally shorter than required for completely filling the accumulator by said particles as withdrawn, weighing means for receiving the contents of the accumulator upon each discharge, automatic weight recording means associated with said weighing means, means operating at a predetermined time subsequent to each discharge for actuating said recorder, and means for automatically discharging said contents from the weighing means before the next discharge from the accumulator.

8. Apparatus for metering the flow of finely divided particles as carried by a fluid stream, comprising means for continuously withdrawing from the stream a relatively small substantially constant proportion of the total amount of the particles being carried past the region of withdrawal, an accumulator for receiving said withdrawn particles, a time controlled device for discharging said accumulator at predetermined timed intervals, a weighing balance for receiving the contents of the accumulator upon each discharge, automatic weight recording means associated with said balance, means for actuating said recorder to record the weight at a predetermined time after each discharge sufficient for the balance to become stabilized, and means for automatically discharging said contents from the balance before the next discharge from the accumulator.

9. Apparatus for metering the flow of finely divided particles as carried by a fluid stream, comprising means for continuously withdrawing from the stream a relatively small substantially constant proportion of the total amount of the particles being carried past the region of withdrawal, an accumulator for receiving said withdrawn particles, a time controlled device for discharging said accumulator at predetermined timed intervals, weighing means for receiving the contents of the accumulator upon each discharge, automatic weight recording means associated with said weighing means, and means for automatically discharging said contents from the weighing means at least on or before a predetermined time prior to the next discharge from the accumulator.

GEORGE HYDE.